Jan. 23, 1968     A. J. HARDER     3,364,941
CHECK VALVE
Filed Sept. 9, 1965
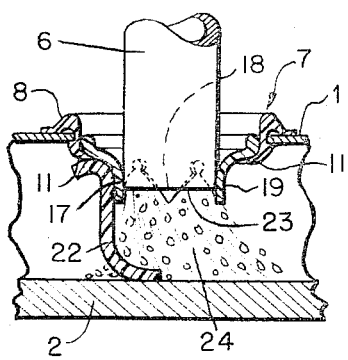
FIG. 3
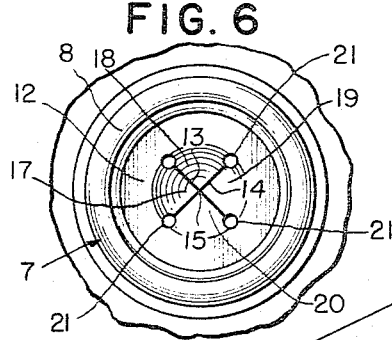
FIG. 4
FIG. 6
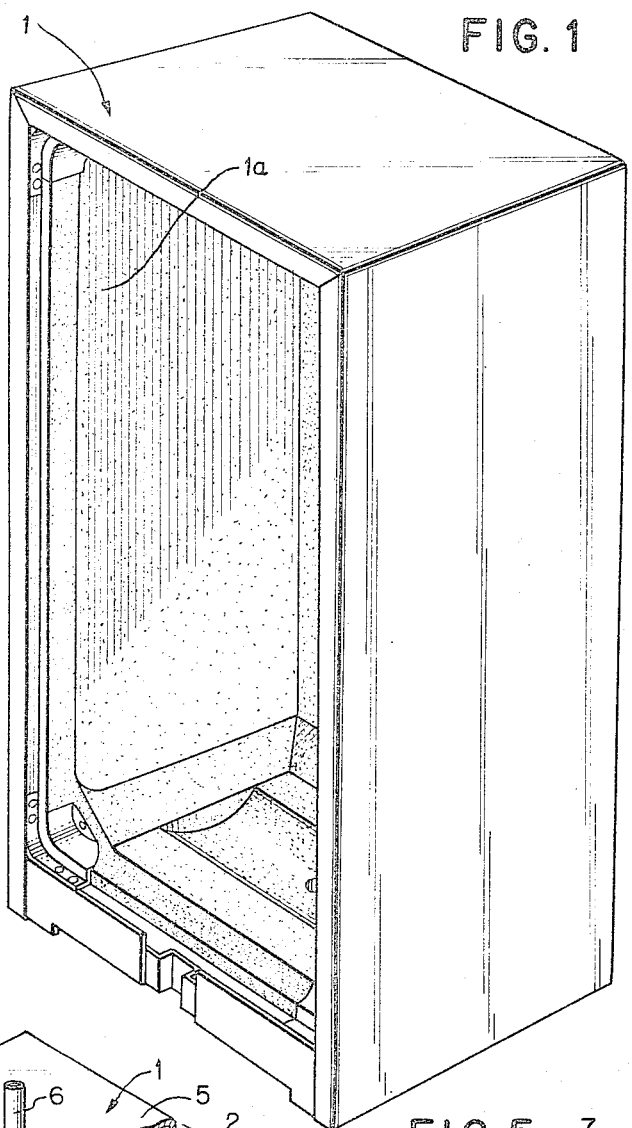
FIG. 1
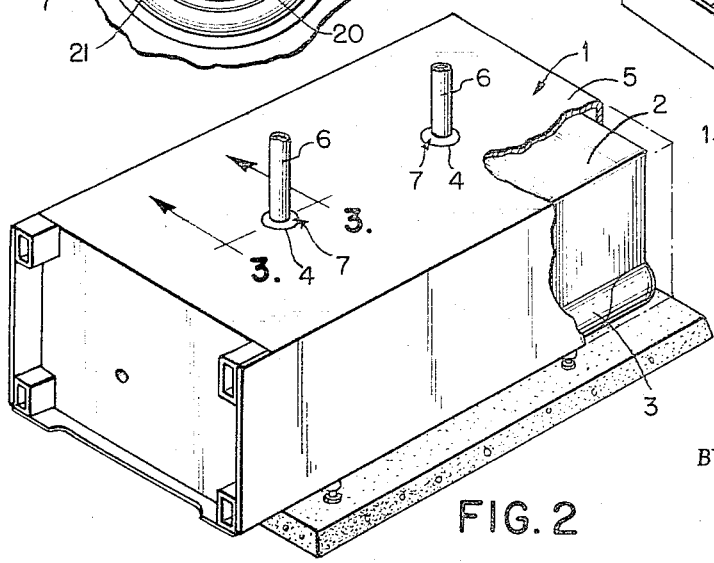
FIG. 2
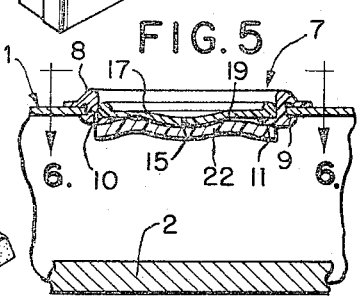
FIG. 5
INVENTOR.
Arthur J. Harder
BY
ATTORNEY

United States Patent Office 3,364,941
Patented Jan. 23, 1968

3,364,941
CHECK VALVE
Arthur J. Harder, Franklin Park, Ill., assignor to General
Electric Company, a corporation of New York
Filed Sept. 9, 1965, Ser. No. 485,984
6 Claims. (Cl. 137—525.3)

This invention relates to check valves, and more particularly to check valves of the type which permit the passage of a conduit in one direction, and—when the conduit is withdrawn—very rapidly provide a seal against escape of fluid following the withdrawal.

It is an object of my invention to provide an economical check valve structure which will, in response to pressure on the side from which the conduit was withdrawn, provide rapid sealing upon withdrawal of a conduit.

More specifically, it is a further object of my invention to provide a check valve of elastomeric material for the purpose described above.

In one aspect of my invention, I provide a check valve which, as mentioned, is particularly suited for permitting passage of a conduit, along its own axis, through an opening, and for sealing the opening upon withdrawal of the conduit. The valve is provided with peripheral means for sealingly engaging the edge of the opening so as to be held therein. The valve further includes a sheet of elastomeric material covering the opening within the peripheral means. This sheet has a plurality of slits therein, intersecting substantially at the center of the sheet and preferably terminating in spaced relation to the peripheral means. The slits define a plurality of flaps which are biased to a position of contiguous juxtaposition, but which are separable at the point of intersection. One of these flaps has secured thereto on one side a cover section formed of elastomeric material. The contour and size of the cover section is such that the cover section covers the flaps entirely when it is pressed against the sheet.

As a result, the flaps may be deformed to allow passage of a conduit between them through to the side of the flap where the cover is secured. Then, upon withdrawal of the conduit, the elastomeric nature of the material causes the flaps to spring back into contiguous juxtaposition, and further causes the cover section to respond to pressure on the one side so as to lie in sealing relationship against the sheet.

The subject matter which I regard as my invention is particularly pointed out and distinctly claimed in the concluding portion of this specification. My invention, however, together with further objects and advantages thereof, will best be understood by reference to the following description taken in conjunction with the accompanying drawing.

In the drawing,

FIGURE 1 is a view in perspective of a cabinet casing, specifically a refrigerator cabinet casing, which has been provided with a molded inner coat of foamed insulating material;

FIGURE 2 is a view in perspective, partly broken away to show details, of the cabinet of FIGURE 1 positioned on a mold to effect the molding of the insulation shown in FIGURE 1;

FIGURE 3 is a view along line 3—3 in FIGURE 2;

FIGURE 4 is a view similar to FIGURE 3 illustrating my improved valve at a subsequent time in the molding operation;

FIGURE 5 is a similar view showing my improved valve at an earlier time during the molding operation; and FIGURE 6 is a view along line 6—6 in FIGURE 5.

Referring now to the drawing, and more particularly initially to FIGURES 1 and 2, there is shown a typical structure, such as a refrigerator casing 1, of the type which may have a substantial thickness of foamed insulation 1a formed therein by a molding operation. This molding operation may readily be effected by positioning casing 1 over a mold 2, then providing any suitable sealing means such as that shown at 3 so as to enclose the space between the casing and the mold, and then introducing resin in a liquid or semi-liquid state into the space between casing 1 and mold 2 so that it may foam, fill the space, and then cure, thereby to provide the covering 1a shown in FIGURE 1.

The precise way of molding the foam is not significant to the present invention, and it will be understood that means of doing this are known in the art. Specific means of carrying out such molding operations are, for instance, fully described and claimed in applications Ser. Nos. 485,985 and 485,997, filed concurrently herewith, respectively in my name and jointly by Richard J. Carbary and myself, both of which applications are assigned to the same assignee as the present invention.

It will be understood that, in order to effect the introduction of the liquid or semi-liquid between mold 2 and casing 1, openings 4 are provided in the back 5 of the casing so that conduits 6 may be introduced therethrough. It is of high importance to effect quick closure of the openings 4 when conduits 6 are withdrawn after a sufficient amount of resin has been introduced; otherwise, the fact that some of the resin will be quite closely adjacent the openings, and the fact that the resin is expanding rapidly as a result of the foaming action, will cause a substantial amount of resin to come out through the openings.

It is to effect the rapid closure of openings 4 that improved valves 7 of my invention are provided. This valve can best be understood by reference to FIGURES 3 through 6 for the remainder of the description. Specifically, I contemplate the provision of a peripheral section 8 which may, as shown, be in the nature of a grommet having a groove 9 which receives the edge 10 of opening 4 so as to secure the valve 7 within the opening. In the preferred embodiment shown, the peripheral structure 8 includes an annular inwardly extending lip 11; a sheet of material 12 is firmly secured at its outer edge to inwardly extending lip 11. This may be effected by heat sealing, or any other suitable means of causing adhesion to result. It will be understood, though, that sheet 12 may be molded directly to peripheral structure 8, eliminating any need for the extra lip 11.

It can be observed in FIGURE 5 wherein the valve is in its initial condition, that is, no pressure is exerted on one side of it in excess of that on the other, that sheet 12 has a generally dished configuration which is concave on the outside and convex on the inside. Referring now specifically to FIGURE 6, sheet 12 has a pair of slits 13 and 14 which intersect a point 15 substantially at the center of the sheet, and preferably terminate in spaced relation to peripheral section 8. Slits 13 and 14 cooperatively form four flaps 17, 18, 19 and 20. Each flap is normally contiguously juxtaposed relative to the adjacent flaps, that is, it is separated from them only by the slits and, in fact, is actually in contact.

To relieve concentrated stress on the material of sheet 12 at the ends of the flaps, small circular sections, such as that shown at 21, may be punched or cut out. This spreads the area over which the bending stress of the flap is provided, rather than permitting it to be concentrated at virtually a single point.

Firmly secured to a portion of sheet 12 which includes only one of the flaps, in this particular case flap 17, is a cover member 22; member 22 is normally formed of the same general type of elastomeric material; preferably it has a slightly harder consistency than sheet 12. The cover member has a cross-section large enough to insure that it will entirely cover the flaps when pressed against sheet 12. In fact, in the preferred embodiment shown, the shape of the cover member 22 is essentially the same as that of the sheet 12 so that when the cover member 22 is pressed upwardly, as shown in FIGURE 4, it engages the underside of lip 11 around the entire periphery of opening 4.

In brief, then, prior to a foaming operation, and after proper positioning of the valve 7 in position in opening 4, the valve has the appearance shown in FIGURE 5. Then, when resin in liquid or semi-liquid form is to be introduced into the space between mold 2 and casing 1, each conduit 6 is brought down substantially axially so as to enter an opening 4 as shown in FIGURE 3.

As the conduit 6 moves down, the end 23 thereof forces the flaps 17, 18, 19 and 20 away from each other at their point of intersection 15, with each flap bending about its base as formed by a line drawn between the two small openings at the ends of the slits which form that particular flap. As flap 17 is distorted with the others in order to permit entry of conduit 6, cover 22 is carried with the flap so as to provide an entirely open condition for entrance of the resin shown by the numeral 24 (FIGURE 3). It will be understood that the size of the opening provided by intersecting slits 13 and 14 and the diameter of conduit 6 are preferably related so that when the conduit is inserted the flaps will have a substantially sealing relationship along the outside of the conduit 6, as shown in FIGURE 3.

When a sufficient quantity of resin has been introduced, the flow of resin through conduit 6 is shut off, and the conduit is then withdrawn. The elastomeric nature of the flaps causes them to follow the end 23 of the conduit as the conduit upwardly, so that the flaps virtually snap to a position of substantial closure when the conduit has been fully withdrawn. The movement of flap 17 carries with it cover member 22 which provides, even without the exercise of pressure thereon, substantial coverage of the opening.

However, this effect is increased so that a true seal is provided when, usually because of the presence of the expanding resin, pressure increases on the underside of cover 22. This pressure forces the cover 22 flat against the sheet 12, and an sealing relationship therewith. In fact, typically, the pressure of the foam will eventually reach the point where it causes a slight bowing out of the cover, as shown at 25 in FIGURE 4.

In addition to sealing tightly against the sheet so as to cover entirely the flaps and the slits which define them, cover 22 also seals tightly against lip 11 as a result of the pressure being exerted by the foam, when such a lip is provided. Thus, both by engagement with the flaps and by engagement with the lip, a thorough seal is very quickly provided by the improved valve structure. The greater the pressure of the foam from within, the more secure the seal.

It will, of course, be understood that a few drops of the foam may fall off the conduit 6 as it is being withdrawn. In such a case, the expansion thereof may cause a small mass of foamed resin, such as that shown at 26 in FIGURE 4, to be cured on the outside of valve 7. In such a case, if the mass is large enough, it may easily be cut off. Normally, though, the mass will be so small that it is most inconspicuous; in any event, it does not effect the functioning of the valve in any way.

It will be understood that while in accordance with the patent statutes I have described what at present is considered to be the preferred embodiment of my invention, it will be obvious to those skilled in the art that various changes and modifications may be made therein without departing from my invention, and it is therefore aimed in the appended claims to cover all such changes and modifications as fall within the true spirit and scope of my invention.

What I claim as new and desire to secure by Letters Patent of the United States is:

1. A check valve particularly suited for permitting passage of a conduit along its axis through an opening and for sealing the opening upon withdrawal of the conduit, said valve comprising:
    (a) peripheral means for sealingly engaging the edge of the opening;
    (b) a sheet of elastomeric material covering said opening within said peripheral means, said sheet having a plurality of slits therein intersecting substantially at the center of said sheet, said slits defining a plurality of flaps biased to a position of contiguous juxtaposition and which are separable at the point of intersection; and
    (c) a cover section formed of elastomeric material secured to one of said flaps on one side thereof, said cover section having a contour and size relative to said flaps such as to cover them entirely when pressed against said sheet;
    (d) whereby said flaps may be deformed to allow passage of a conduit between them through to said one side and, upon withdrawal of the conduit, said flaps spring back into contiguous juxtaposition, with said cover section being responsive to pressure to lie in sealing relation relative to said sheet.

2. The valve defined in claim 1 wherein said sheet normally has a dished configuration, convex on said one side, and concave on the other side.

3. The valve defined in claim 1 wherein two intersecting slits are provided, forming four equally sized flaps.

4. The valve defined in claim 1 wherein a small circular hole is provided at each end of each slit for stress-relieving purposes.

5. The valve defined in claim 1 wherein said peripheral means includes a continuous sealing lip on said one side and said cover section is formed so that its outer edge sealingly engages said lip in response to pressure.

6. A check valve particularly suited for permitting passage of a conduit along its axis through an opening and for sealing the opening upon withdrawal of the conduit, said valve comprising:
    (a) peripheral means for sealingly engaging the edge of the opening;
    (b) a sheet of elastomeric material covering said opening within said peripheral means, said sheet having a plurality of slits therein intersecting substantially at the center of said sheet and terminating in spaced relation to said peripheral means, said slits defining a plurality of flaps biased to a position of contiguous juxtaposition and which are separable at the point of intersection; and
    (c) a cover section formed of elastomeric material secured to one of said flaps on one side thereof, said cover section having a contour and size relative to said flaps such as to cover them entirely when pressed against said sheet;
    (d) whereby said flaps may be deformed to allow passage of a conduit between them through to said one side and, upon withdrawal of the conduit, said flaps spring back into contiguous juxtaposition, with said cover section being responsive to pressure to lie in sealing relation against said sheet.

References Cited

UNITED STATES PATENTS

| | | | |
|---|---|---|---|
| 2,151,466 | 3/1939 | Eken | 137—223 |
| 2,400,955 | 5/1946 | Samel | 137—223 |
| 2,568,976 | 9/1951 | Andrews | 137—525.3 |
| 3,014,611 | 12/1961 | Marshall | 52—743 |
| 3,242,625 | 3/1966 | Tillinghast | 52—743 |

WILLIAM F. O'DEA, *Primary Examiner.*

W. H. WRIGHT, *Assistant Examiner.*